(12) United States Patent
Yamamoto

(10) Patent No.: US 7,203,009 B2
(45) Date of Patent: Apr. 10, 2007

(54) LENS DEVICE

(75) Inventor: Shigeru Yamamoto, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/340,720

(22) Filed: Jan. 27, 2006

(65) Prior Publication Data

US 2006/0176586 A1 Aug. 10, 2006

(30) Foreign Application Priority Data

Feb. 4, 2005 (JP) ............................. 2005-029583

(51) Int. Cl.
 *G02B 15/14* (2006.01)
 *G02B 7/02* (2006.01)
 *G03B 17/00* (2006.01)
 *G03B 7/099* (2006.01)

(52) U.S. Cl. ............... 359/699; 359/694; 359/695; 359/700; 359/701; 359/823; 359/825; 396/246; 396/268; 396/72; 396/355; 396/535; 348/240.99; 348/357

(58) Field of Classification Search ........ 359/694–706, 359/819, 822, 823, 825; 396/21, 24, 37, 396/72, 74, 246, 268, 298, 355, 529, 535; 348/240.99, 335, 357, 373, 375

See application file for complete search history.

(56) References Cited

U.S. PATENT DOCUMENTS 3,369,470 A * 2/1968 Downey .................. 396/37
3,540,364 A * 11/1970 Ono ........................ 396/268
3,951,522 A * 4/1976 Hashimoto ............... 359/694
5,034,762 A * 7/1991 Kohmoto .................. 396/72
5,130,851 A * 7/1992 Shirie ...................... 359/700
5,760,972 A * 6/1998 Fukino ..................... 359/701
5,933,285 A * 8/1999 Sato et al. ................ 359/694
6,819,502 B2 * 11/2004 Nomura et al. ........... 359/701
6,853,500 B2 * 2/2005 Nomura et al. ........... 359/695
6,919,995 B2 * 7/2005 Nomura et al. ........... 359/695
7,050,244 B2 * 5/2006 Hayashi et al. ........... 359/701

FOREIGN PATENT DOCUMENTS

| JP | 56-77808 A | 6/1981 |
| JP | 1-142609 A | 6/1989 |
| JP | 2-44306 A | 2/1990 |
| JP | 5-100139 A | 4/1993 |
| JP | 10-268175 A | 10/1998 |
| JP | 2003-248157 A | 9/2003 |

* cited by examiner

*Primary Examiner*—Loha Ben
(74) *Attorney, Agent, or Firm*—Birch, Stewart, Kolasch & Birch, LLP

(57) ABSTRACT

A lens device in which a first movable lens holding frame and a second movable lens holding frame are moved along an optical axis by rotating a cam cylinder rotatably provided on a lens barrel, an escape channel for escapement of a portion of the second movable lens holding frame being formed in the first movable lens holding frame, the lens device comprising:

a light shielding member moved along the optical axis by the rotation of the cam cylinder, the light shielding member being moved to a position at which the light shielding member closes the escape channel of the first movable lens holding frame.

4 Claims, 7 Drawing Sheets

TELEPHOTO END

WIDE-ANGLE END

LENS DEVICE

BACKGROUND OF THE INVENTION

1. Field of the Invention

The present invention relates to a lens device and, more particularly, to a lens device in which a first movable lens holding frame and a second movable lens holding frame are moved forward or rearward along an optical axis by rotating a cam cylinder to perform zooming.

2. Description of the Related Art

In zoom lens devices for electric news gathering (ENG) cameras, a type of zoom lens device is dominant in which zooming is performed by two movable lens group: a first movable lens group functioning as a variable-power lens group, and a second movable lens functioning as a focus correcting lens group. A cam cylinder is rotatably provided in the lens barrel of such a zoom lens device. In the cam cylinder are formed cam channels engaged with cam rollers projecting from a frame for holding the first movable lens group (hereinafter referred to as "first movable lens holding frame") and a frame for holding the second movable lens group (hereinafter referred to as "second movable lens holding frame"). These cam rollers are passed through the cam channels to be engaged with straight-travel grooves formed in a fixed cylinder placed outside the cam cylinder. When the cam cylinder is rotated, the first and second movable lens holding frames are moved forward or rearward in predetermined paths along the optical axis by the straight-travel guide function of the cam channel and the straight-travel grooves, thereby adjusting the focal length.

On the other hand, a zoom lens device is known which is designed to reduce its overall size by reducing the lens optical path length while maintaining the desired image-taking power. In this zoom lens device, when the distance between the first and second movable lens holding frames is minimized, escape channels for escapement of the cam rollers on the second movable lens holding frame are formed in the first movable lens holding frame to set a longer stroke of movement between the first and second movable lens holding frames, thereby ensuring the desired image-taking power.

In the case where such escape channels are formed in the first movable lens holding frame, there is no problem when the cam rollers on the second movable lens holding frame are positioned in the escape channels. However, when the cam rollers are retreated from the escape channels, detrimental rays (stray light) enter the camera through the escape channels to generate ghost.

To solve this problem, a light shielding member for closing the escape channels of the first movable lens holding frame is provided in a lens device disclosed in Japanese Patent Application Laid-Open No. 2003-248157. The light shielding member prevents detrimental rays from entering the camera through the escape channels. When the distance between the first and second movable lens holding frames is minimized, the light shielding member is retreated from the escape channels by being forced by the cam rollers on the second movable lens holding frame. When the cam rollers are retreated from the escape channels, the light shielding member is returned by an urging force of a spring to the position at which it closes the escape channels.

In the lens device disclosed in Japanese Patent Application Laid-Open No. 2003-248157, however, impact sound and vibration are generated when the cam rollers on the second movable lens holding frame collides against the light shielding member. A cameraperson operating the lens device has a feeling of strangeness from the impact sound and vibration.

SUMMARY OF THE INVENTION

In view of the above-described circumstances, an object of the present invention is to provide a lens device in which an escape channel is formed in a movable lens holding frame, and which is capable of preventing detrimental rays from entering through the escape channel, without generating impact sound and vibration.

To achieve the above-described object, according to a first aspect of the present invention, there is provided a lens device in which a first movable lens holding frame and a second movable lens holding frame are moved along an optical axis by rotating a cam cylinder rotatably provided on a lens barrel, an escape channel for escapement of a portion of the second movable lens holding frame being formed in the first movable lens holding frame, the lens device having a light shielding member moved along the optical axis by the rotation of the cam cylinder, the light shielding member being moved to a position at which the light shielding member closes the escape channel of the first movable lens holding frame.

According to the first aspect of the present invention, the cam cylinder that moves the first and second movable lens holding frames moves the light shielding member to close the escape channel of the first movable lens holding frame, thereby preventing detrimental rays from entering through the escape channels, without generating impact sound and vibration. That is, when the first movable lens holding frame is moved to such a position that the portion of the second movable lens holding frame is retreated from the escape channel of the first movable lens holding frame, and that detrimental rays can enter through the escape channel, the light shielding member also moved by the cam cylinder is placed at the position at which it closes the escape channel. Also, since according to the first aspect of the present invention the light shielding member is moved by the common cam cylinder, the mechanism for moving the light shielding member can be constructed without largely increasing the number of component parts.

To achieve the above-described object, according to a second aspect of the present invention, there is provided a lens device having a lens barrel, a cam cylinder rotatably provided in the lens barrel, a first movable lens holding frame engaged with a first cam channel of the cam cylinder by means of a first cam follower, the first movable lens holding frame having an escape channel formed in its outer peripheral portion, a second movable lens holding frame engaged with a second cam channel of the cam cylinder by means of a second cam follower, the second cam follower being positioned in the escape channel of the first movable lens holding frame when the second movable lens holding frame is brought close to the first movable lens holding frame, and a light shielding member engaged with a third cam channel of the cam cylinder by means of a third cam follower, the moved light shielding member being moved to a position at which the light shielding member closes the escape channel of the first movable lens holding frame.

The lens device in the second aspect of the present invention is a more concrete form of the lens device in the first aspect of the invention. According to the second aspect of the invention, an escape channel in which the second cam follower of the second movable lens holding frame is positioned is formed in an outer peripheral portion of the first movable lens holding frame, and is closed by the light shielding member. That is, when the first movable lens holding frame is moved to such a position that a second cam follower of the second movable lens holding frame is retreated from the escape channel of the first movable lens holding frame, and that detrimental rays can enter through the escape channel, the light shielding member also moved by the cam cylinder is placed at the position at which it closes the escape channel. Also, since according to the second aspect of the present invention the light shielding member is moved by the common cam cylinder, the mechanism for moving the light shielding member can be constructed without largely increasing the number of component parts, as is that in the lens device according to the first aspect of the invention.

According to a third aspect of the present invention, when in the lens device in the first or second aspect of the present invention the first and second movable lens holding frames are positioned so that the distance between the first and second movable lens holding frames is maximized, the light shielding member is moved by the rotation of the cam cylinder to the position at which it closes the escape channel of the first movable lens holding frame. Also, when the first and second movable lens holding frames are positioned so that the distance between the first and second movable lens holding frames is minimized, the light shielding member is moved to a position at which it blocks unnecessary external light to prevent flare due to reflection on an internal surface of the cam cylinder while maintaining an effective optical path diameter.

In the third aspect of the present invention, the range through which the light shielding member is moved by the third cam channel of the cam cylinder is specified. The light shielding member is moved to the position at which it closes the escape channel of the first movable lens holding frame, when the first and second movable lens holding frames are positioned so that the distance between the first and second movable lens holding frames is maximized. That is, the light shielding member closes the escape channel when it is at one end of the range of movement. Also, the light shielding member is moved to a position at which it blocks unnecessary external light to prevent flare due to reflection on an internal surface of the cam cylinder while maintaining an effective optical path diameter, when the first and second movable lens holding frames are positioned so that the distance between the first and second movable lens holding frames is minimized. That is, the light shielding member blocks unnecessary external light while maintaining the effective optical path diameter when it is at the other end of the range of movement. The other end position of the light shielding member is determined by the third cam channel to block unnecessary external light and prevent flare due to reflection on the internal surface of the cam cylinder while maintaining the effective optical path diameter for setting the F value for example, as well as to prevent entrance of detrimental rays through the escape channel.

In the lens device in accordance with the present invention, as described above, the cam cylinder that moves the first and second movable lens holding frames moves the light shielding member to close the escape channel of the first movable lens holding frame, thereby preventing detrimental rays from entering through the escape channels, without generating impact sound and vibration. Also, since according to the present invention the light shielding member is moved by the common cam cylinder, the mechanism for moving the light shielding member can be constructed without largely increasing the number of component parts.

DETAILED DESCRIPTION OF THE PREFERRED EMBODIMENTS

A preferred embodiment of the lens device in accordance with the present invention will be described below in detail with reference to the accompanying drawings.

Figure 1:
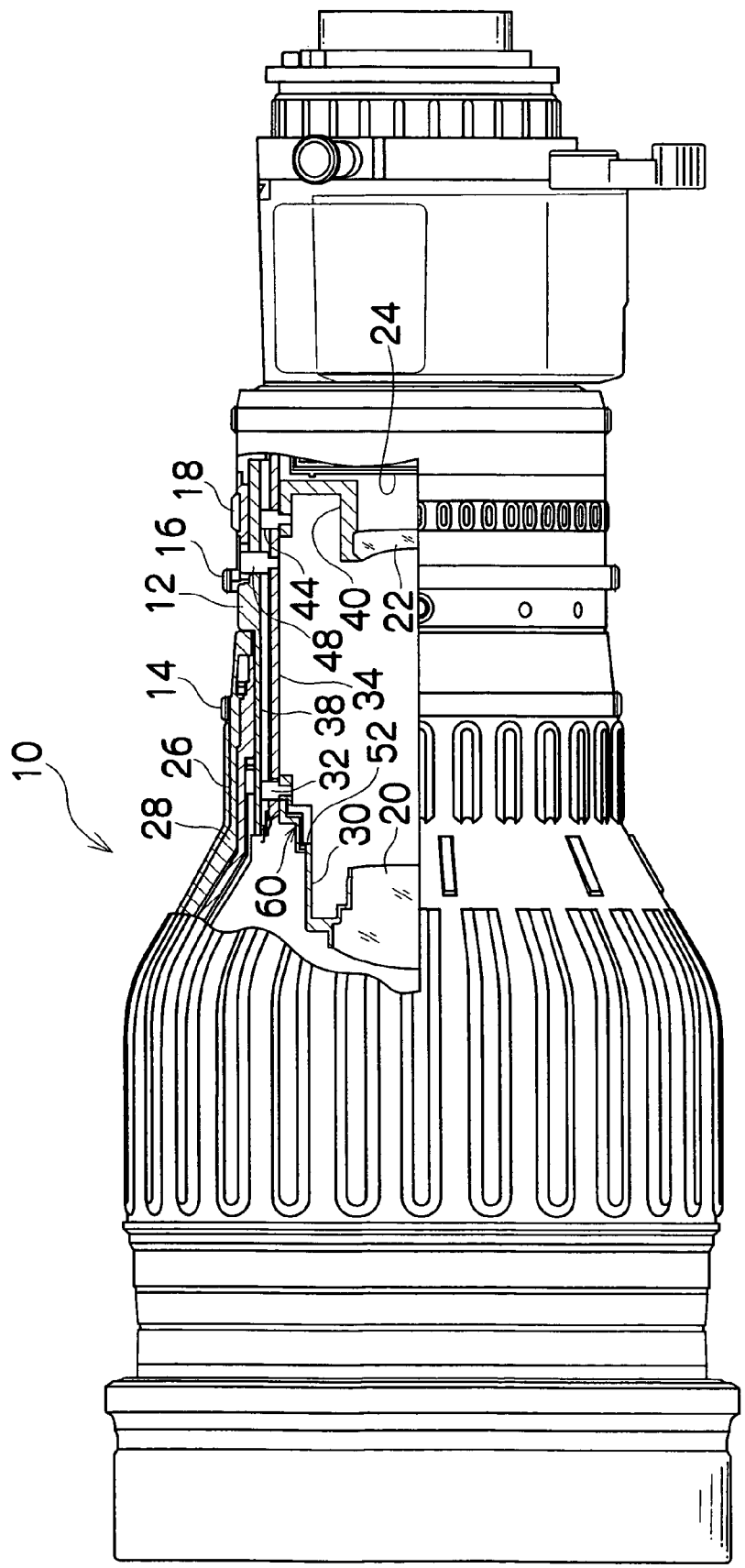
FIG. 1 is a partially fragmentary sectional view of a zoom lens device for an ENG camera to which the present invention is applied.

FIG. 1 is a partially fragmentary sectional view of a zoom lens device 10 for an ENG camera to which the present invention is applied. A focusing ring 14, a zoom ring 15 and an iris ring 18 are rotatably provided on a fixed lens barrel 12 of the zoom lens device 10. In the fixed lens barrel 12 are provided a focusing lens group (not shown), a variable-power lens group (first movable lens) 20, a focus correcting lens group (second movable lens) 22, an iris 24 and a relay lens (not shown) in this order from the left hand side of FIG. 1.

The focusing lens group is supported on a focusing barrel 26 formed integrally with the focusing ring 14. The focusing barrel 26 is supported by a straight-travel mechanism such as a helicoid screw mechanism or a cam mechanism on a lens barrel 28 fixed on the fixed lens barrel 12. The focusing barrel 26 is movable forward and rearward by the straight-travel mechanism. When the focusing barrel 26 is rotated through the focusing ring 14, the focusing lens group is moved forward or rearward, thereby performing focusing. The forward direction is a direction from the camera toward an object to be imaged by the camera, and the rearward direction is a direction from the object to the camera.

Figure 2:
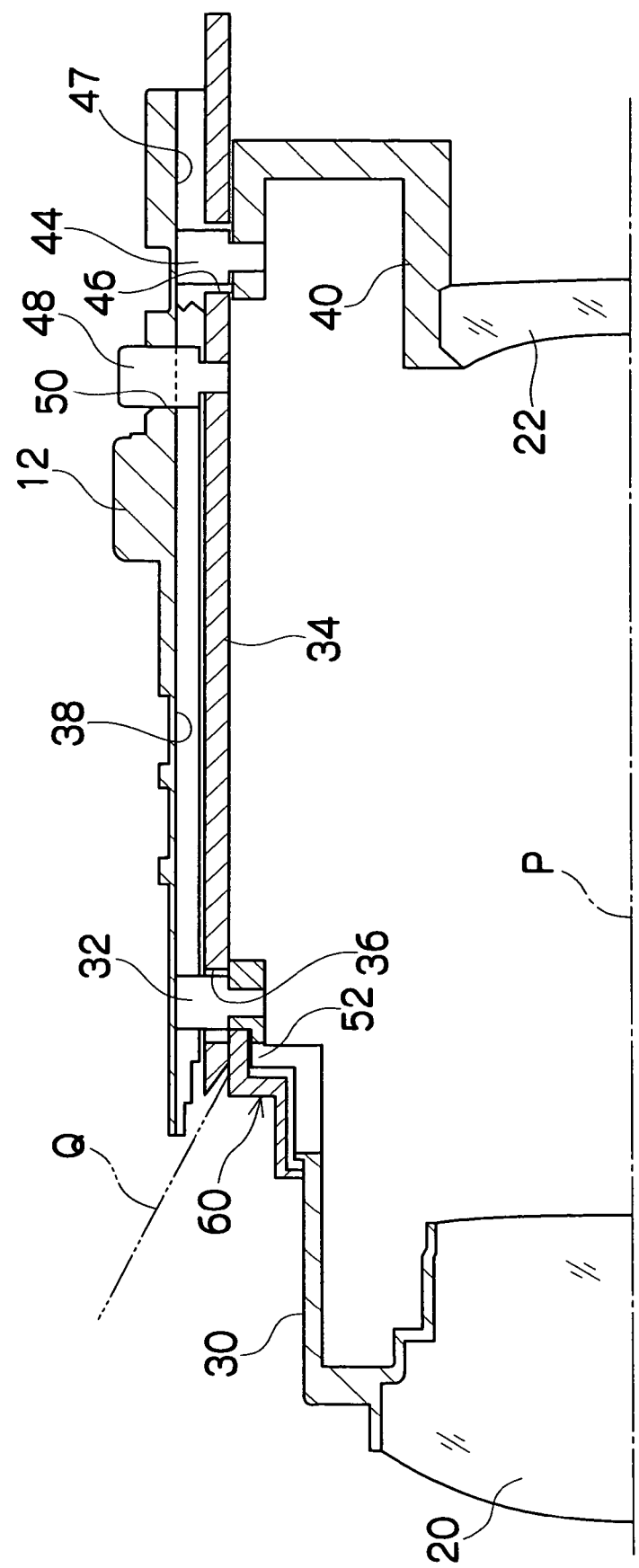
FIG. 2 is an enlarged sectional view of an essential portion of the lens device, showing the positions of lens holding frames when the lens device is at a wide-angle end position.
Figure 3:
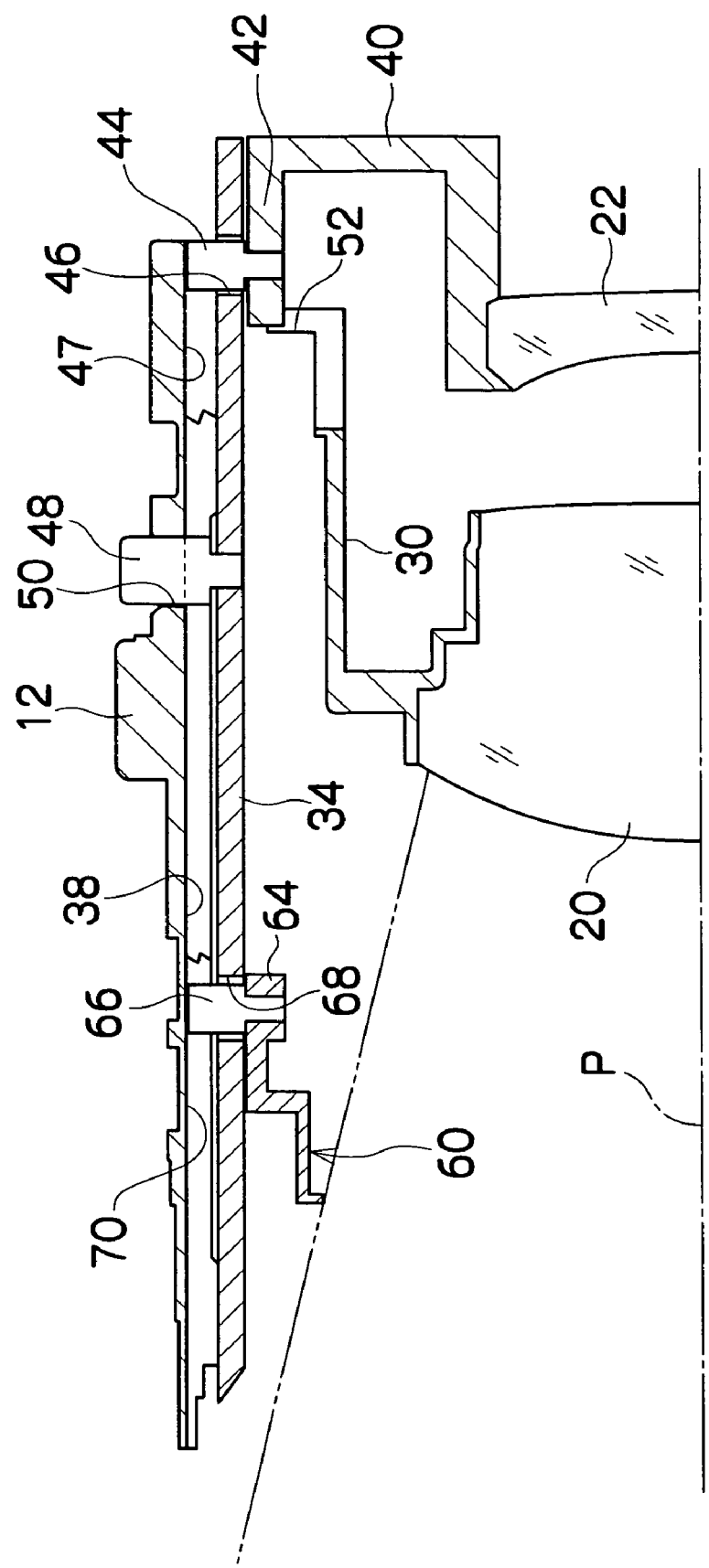
FIG. 3 is an enlarged sectional view of an essential portion of the lens device, showing the positions of lens holding frames when the lens device is at a telephoto end position.

The variable-power lens group 20 is supported on a lens holding frame 30, as shown in FIG. 3. The position of the variable-power lens group 20 shown in FIGS. 1 and 2 is a wide-angle end position determined by one ends 36A of cam channels (first cam channels) 36 (see FIG. 5) of a cam cylinder 34 described below. The position of the variable-power lens group 20 shown in FIG. 3 is a telephoto end position determined by the other ends 36B of the cam channels 36 of the cam cylinder 34.

Figure 4:
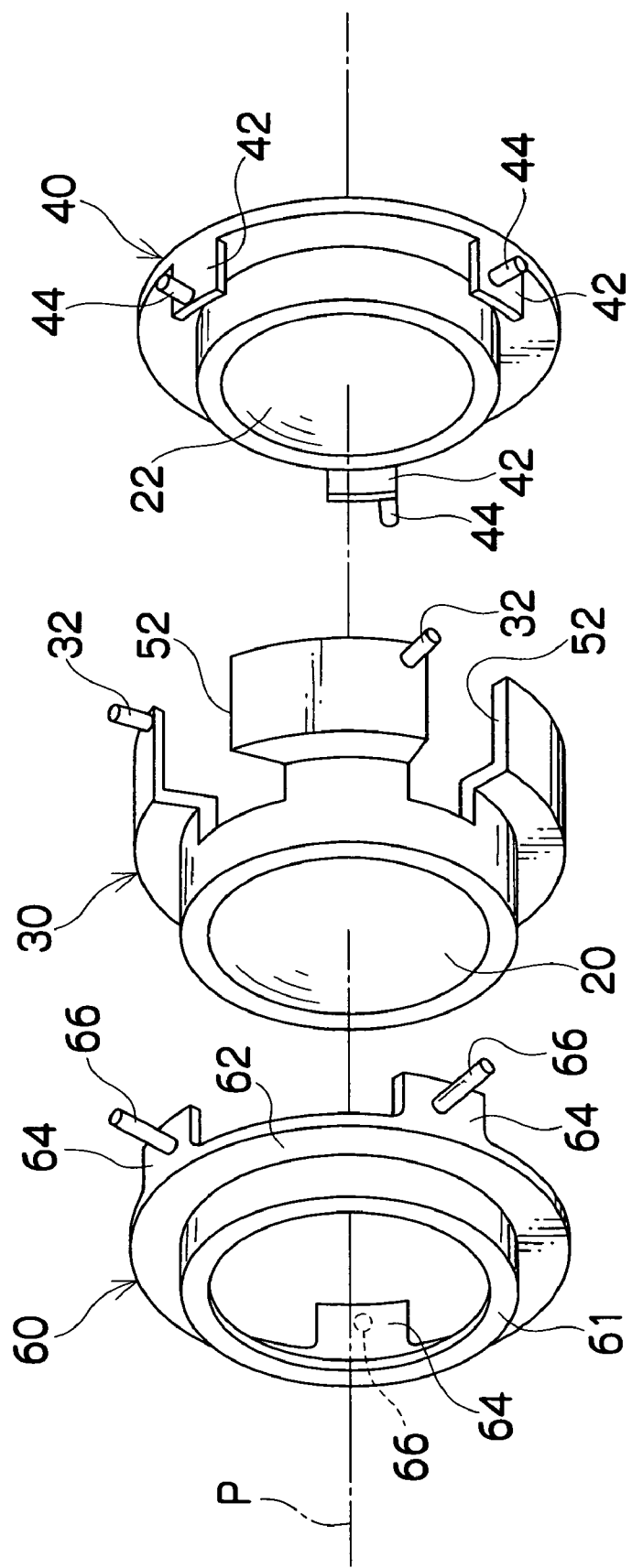
FIG. 4 is a perspective view showing the lens holding frames and a light shielding ring.

As shown in FIG. 4, three cam rollers (first cam followers, only two of which are shown in FIG. 4) 32 are provided at equal intervals on an outer peripheral portion of the lens holding frame 30 so as to project from the same. The cam rollers 32 are engaged with the cam channels 36 of the cam cylinder 34 shown in FIGS. 2 and 5. Top end portions of the cam rollers 32 project out of the cam channels 36 and are engaged with straight-travel grooves 38 formed in an inner peripheral surface of the fixed lens barrel 12. The straight-travel grooves 38 are formed parallel to an image taking optical axis P of the zoom lens device 10.

The focus correcting lens group 22 is supported on a lens holding frame 40, as shown in FIGS. 2 and 3. The position of the focus correcting lens group 22 shown in FIGS. 1 and 2 is a wide-angle end position determined by one ends 46A of cam channels (second cam channels) 46 (see FIG. 5) of the cam cylinder 34. The position of the focus correcting lens group 22 shown in FIG. 3 is a telephoto end position determined by the other ends 46B of the cam channels 46 of the cam cylinder 34.

Cam roller mount portions 42 in generally rectangular form as shown in FIG. 4 are formed at equal intervals in three places on an outer peripheral portion of the lens holding frame 40. Cam rollers (second cam followers) 44 are respectively formed on the cam roller mount portions 42 so as to project from the same. The cam rollers 44 are engaged with cam channels 46 of the cam cylinder 34 shown in FIGS. 3 and 5. Top end portions of the cam rollers 44 project out of the cam channels 46 and are engaged with straight-travel grooves 47 in the fixed lens barrel 12. The straight-travel grooves 47 are also formed parallel to the image taking optical axis P of the zoom lens device 10. The straight-travel grooves 47 are formed at positions offset from the straight-travel grooves 38 in the circumferential direction of the cam cylinder 34.

The cam cylinder 34 is placed inside the fixed lens barrel 12 so as to be rotatable about the image taking optical axis P. A pin 48 projects from an outer peripheral surface of the cam cylinder 34 as shown in FIG. 1. The pin 48 is passed through a slit 50 formed in the fixed lens barrel 12 as shown in FIG. 3 and is fixed on the zoom ring 16, shown in FIG. 1. The slit 50 shown in FIG. 3 is formed along a plane perpendicular to the image taking optical axis P. When the zoom ring 16 is rotated in a range corresponding to the length of the slit 50, the cam cylinder 34 rotates about the image taking optical axis P by following the zoom ring 16. The lens holding frame 30 is thereby moved forward or rearward along the loci of the cam channels 36 and between the ends 36A and the other ends 36B of the cam channels 36. Also, the lens holding frame 40 is thereby moved forward or rearward along the loci of the cam channels 46 and between the ends 46A and the other ends 46B of the cam channels 46. Zooming is thus performed between the wide-angle end shown in FIG. 2 and the telephoto end shown in FIG. 3.

Figure 6:
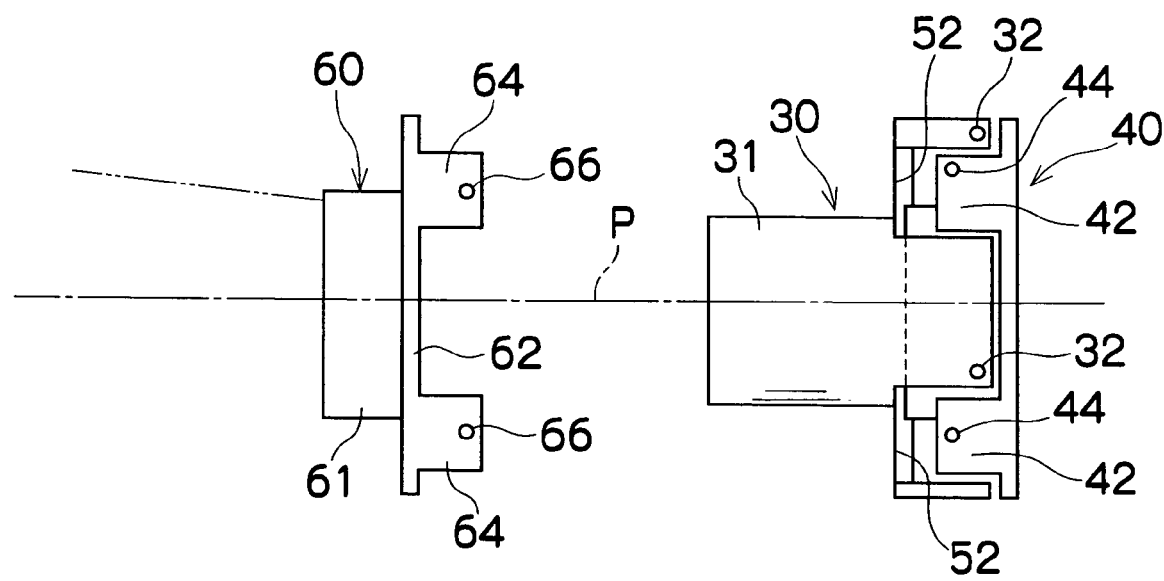
FIG. 6 is an enlarged sectional view of an essential portion of the lens device, showing the positions of the lens holding frames and the light shielding ring when the lens device is at the telephoto end position.

Escape channels 52 are formed at equal intervals in three places (only two of which are indicated in FIG. 4) in an outer peripheral portion of the lens holding frame 30, as shown in FIG. 4. The escape channels 52 enable the cam roller mount portions 42 formed on the lens holding frame 40 to escape as shown in FIG. 6, when the lens holding frame 30 and the lens holding frame 40 are brought close to each other, that is, when the telephoto end and a position close to the telephoto end are reached. The escape channels 52 are formed in a size and shape corresponding to the cam roller mount portions 42.

Since the escape channels 52 are formed in the lens holding frame 30, there is a problem that detrimental rays, e.g., those reflected by the inner peripheral surface of the lens barrel in the rays entering the lens from the front side can enter the imaging area by passing through the escape channels 52 rearward to generate ghost, if no improvement is made in the above-described arrangement.

Figure 7:
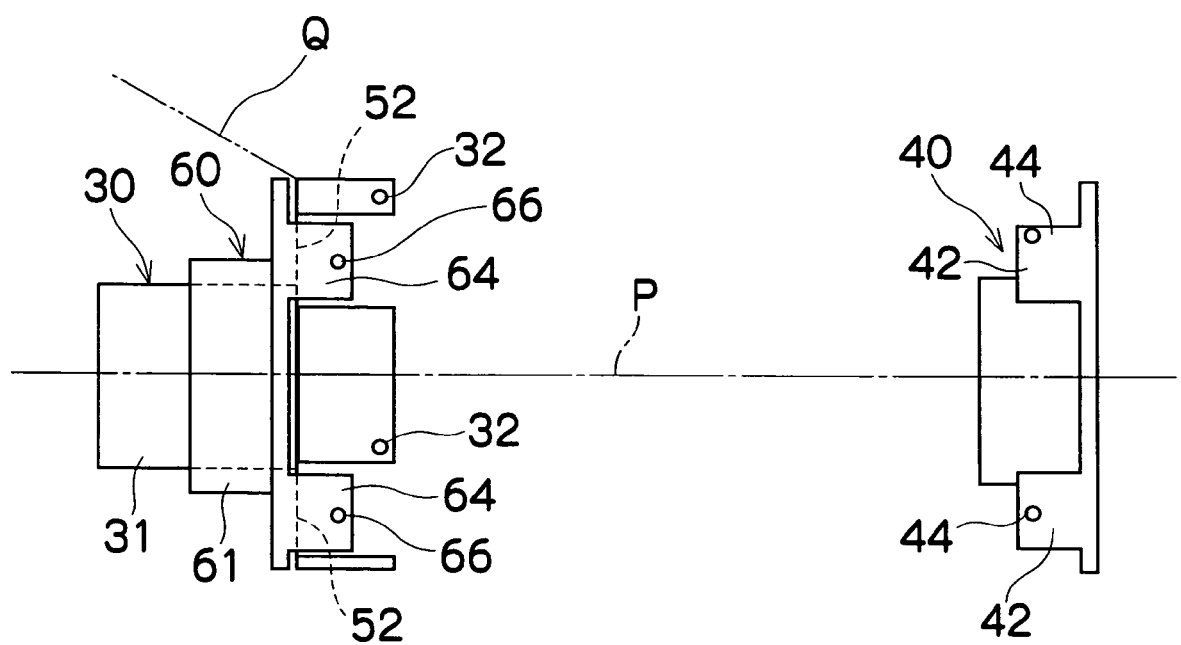
FIG. 7 is an enlarged sectional view of an essential portion of the lens device, showing the positions of the lens holding frames and the light shielding ring when the lens device is at the wide-angle end position.

In this embodiment, therefore, a light shielding ring (light shielding member) 60 is provided to close the escape channels 52 at the end position of the lens holding frame 30.wide-angle As shown in FIGS. 4 and 7, the light shielding ring 60 is constituted by a ring portion 61 for escapement of a frame body 31 of the lens holding frame 30, shielding portions 64 formed at equal intervals in three places on an outer peripheral flange 62 of the ring portion 61 to close the escape channels 52 of the lens holding frame 30 at the wide-angle end position, and cam rollers 66 respectively projecting from the shielding portions 64.

Figure 5:
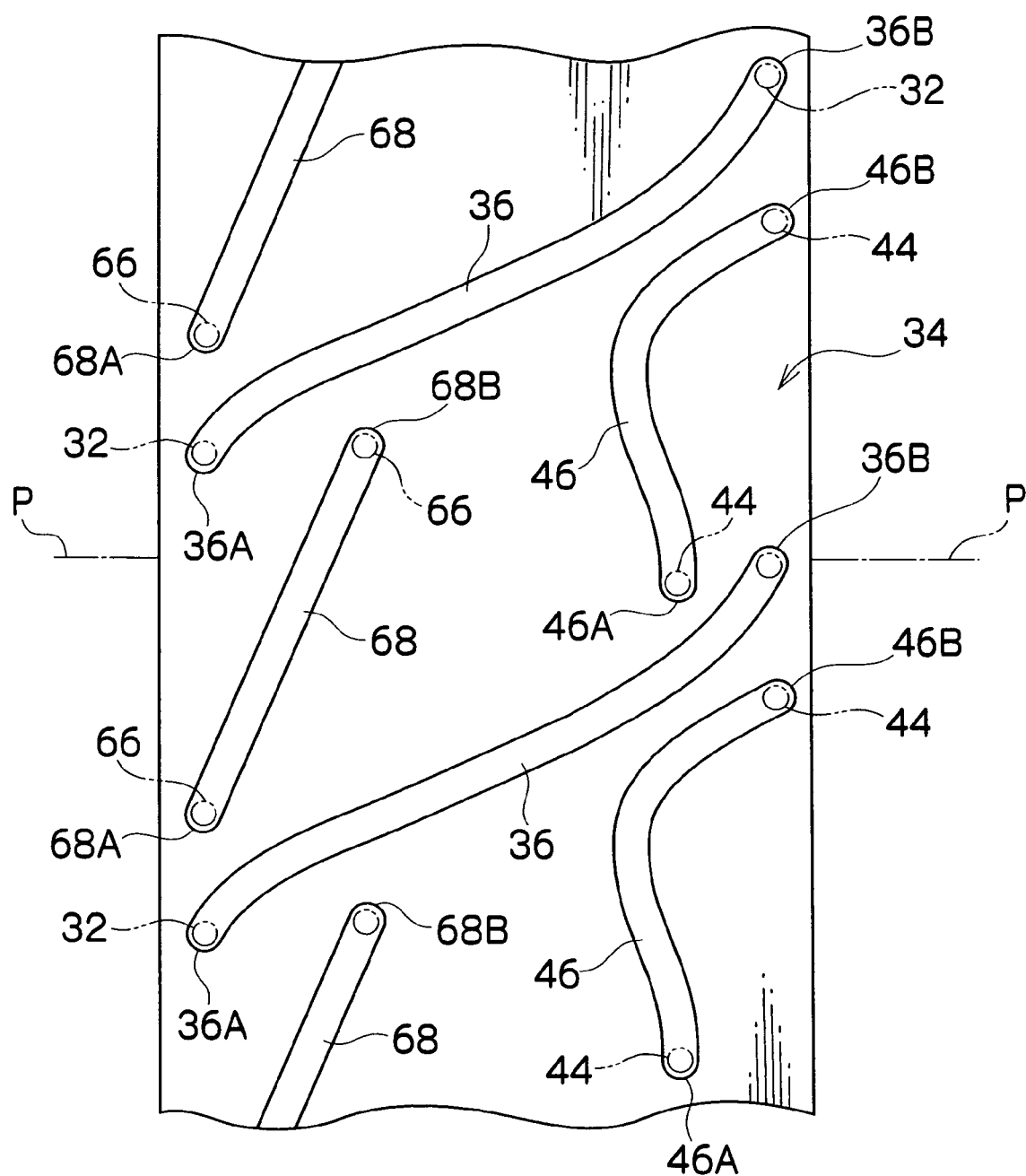
FIG. 5 is an enlarged development of a cam cylinder.

The cam rollers 66 of the light shielding ring 60 are engaged with cam channels (third cam channels) 68 of the cam cylinder 34 shown in FIGS. 3 and 5. Top end portions of the cam rollers 66 project out of the cam channels 68 and are engaged with straight-travel grooves 70 in the fixed lens barrel 12. The straight-travel grooves 70 are also formed parallel to the image taking optical axis P of the zoom lens device 10. The straight-travel grooves 70 are formed at positions offset from the straight-travel grooves 38 and 47 in the circumferential direction of the cam cylinder 34. When the cam cylinder 34 is rotated, the light shielding ring 60 is moved forward or rearward along the loci of the cam channels 68 and between one ends 68A and the other ends 68B of the cam channels 68 in a linked relationship with the lens holding frames 30 and 40. Also, when the cam rollers 66 reach the positions at the ends 68A of the wide-angle end position, the shielding portions 64 enter the escape channels 52 of the lens holding frame 30, as shown in FIG. 7, thus preventing detrimental rays Q from entering rearward through the escape channels 52 from penetrating rearward.

In the zoom lens device 10 of this embodiment, as described above, the cam cylinder 34 that moves the lens holding frames 30 and 40 moves the light shielding ring 60 to close the escape channels 52 of the lens holding frame 30 by the light shielding portions 64, thus preventing detrimental rays Q from entering rearward through the escape channels 52, without generating impact sound and vibration such as those generated in the conventional device.

In the zoom lens device 10, the light shielding ring 60 is moved by the common cam cylinder 34. Thus, The moving mechanism of the light shielding ring 60 can be constructed without largely increasing the number of component parts.

Further, the telephoto end position of the light shielding ring 60 to which the movement of the light shielding ring 60 is limited by the other ends 68B of the cam channels 68 of the cam cylinder 34 is determined so that, as shown in FIG. 6, unnecessary external light is blocked to prevent flare due to reflection on the internal surface of the cam cylinder 34, while the desired effective optical path diameter of subject light is ensured. If the ends 68A and 68B of the cam channels 68 are specified, entrance of detrimental rays P through the escape channels 52 at the wide-angle end position can be prevented and unnecessary external light can be blocked to prevent flare due to reflection on the internal surface of the cam cylinder 34, while the effective optical path diameter for setting the F value for example is ensured.

What is claimed is:

1. A lens device in which a first movable lens holding frame and a second movable lens holding frame are moved along an optical axis by rotating a cam cylinder rotatably provided in a lens barrel, an escape channel for escapement of a portion of the second movable lens holding frame being formed in the first movable lens holding frame, the lens device comprising:

a light shielding member moved along the optical axis by the rotation of the cam cylinder, the light shielding member being moved to a position at which the light shielding member closes the escape channel of the first movable lens holding frame.

2. The lens device according to claim 1, wherein when the first and second movable lens holding frames are positioned so that the distance between the first and second movable lens holding frames is maximized, the light shielding member is moved by the rotation of the cam cylinder to the position at which the light shielding member closes the escape channel of the first movable lens holding frame; and wherein when the first and second movable lens holding frames are positioned so that the distance between the first and second movable lens holding frames is minimized, the light shielding member is moved to a position at which the light shielding member blocks unnecessary external light to prevent flare due to reflection on an internal surface of the cam cylinder while maintaining an effective optical path diameter.

3. A lens device comprising:

a lens barrel;

a cam cylinder rotatably provided in the lens barrel;

a first movable lens holding frame engaged with a first cam channel of the cam cylinder by means of a first cam follower, the first movable lens holding frame having an escape channel formed in its outer peripheral portion;

a second movable lens holding frame engaged with a second cam channel of the cam cylinder by means of a second cam follower, the second cam follower being positioned in the escape channel of the first movable lens holding frame when the second movable lens holding frame is brought close to the first movable lens holding frame; and a light shielding member engaged with a third cam channel of the cam cylinder by means of a third cam follower, the moved light shielding member being moved to a position at which the light shielding member closes the escape channel of the first movable lens holding frame.

4. The lens device according to claim 2, wherein when the first and second movable lens holding frames are positioned so that the distance between the first and second movable lens holding frames is maximized, the light shielding member is moved by the rotation of the cam cylinder to the position at which the light shielding member closes the escape channel of the first movable lens holding frame; and wherein when the first and second movable lens holding frames are positioned so that the distance between the first and second movable lens holding frames is minimized, the light shielding member is moved to a position at which the light shielding member blocks unnecessary external light to prevent flare due to reflection on an internal surface of the cam cylinder while maintaining an effective optical path diameter.

* * * * *